Jan. 11, 1966
L. L. TUCKER
3,228,097
METHOD FOR MAKING RIMS
Filed April 2, 1964
3 Sheets-Sheet 1
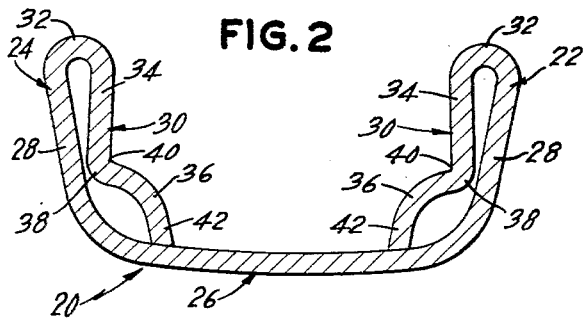
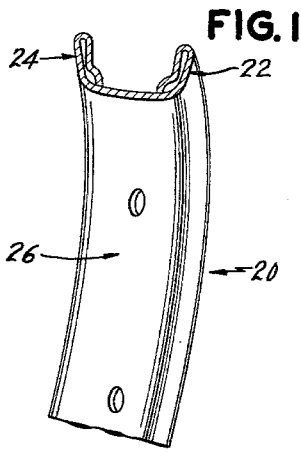
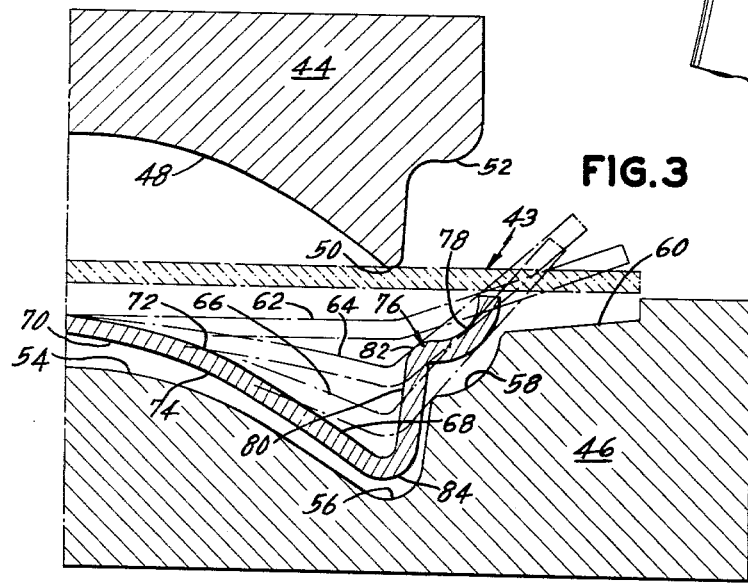
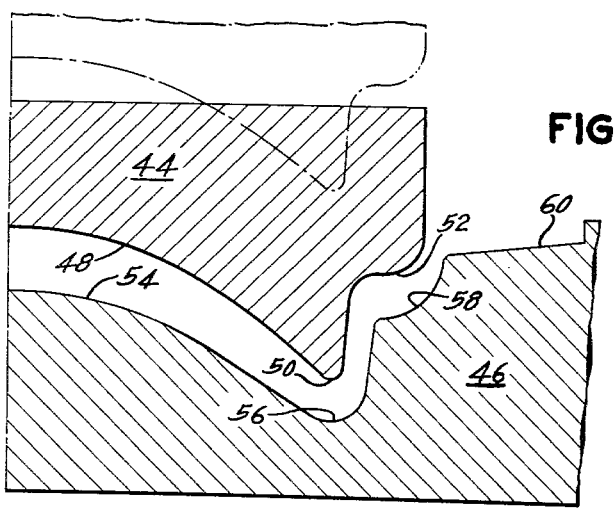
INVENTOR.
Leonard L. Tucker
BY Edwin Levisohn &
Henry R. Lerner
ATTORNEYS Jan. 11, 1966  L. L. TUCKER  3,228,097
METHOD FOR MAKING RIMS
Filed April 2, 1964  3 Sheets-Sheet 2

INVENTOR.
Leonard L. Tucker
BY Edwin Levisohn
Henry R Lerner
ATTORNEYS

Jan. 11, 1966 L. L. TUCKER 3,228,097
METHOD FOR MAKING RIMS
Filed April 2, 1964 3 Sheets-Sheet 3

INVENTOR.
Leonard L. Tucker
BY Edwin Levisohn &
Henry R Lerner
ATTORNEYS

United States Patent Office 3,228,097
Patented Jan. 11, 1966

3,228,097
METHOD FOR MAKING RIMS
Leonard L. Tucker, Dolgeville, N.Y., assignor to H. P. Snyder Manufacturing Company, Inc., Little Falls, N.Y., a corporation of New York
Filed Apr. 2, 1964, Ser. No. 356,746
8 Claims. (Cl. 29—159.1)

The present invention relates to a method of making a new rim construction for a pneumatic bicycle tire or the like.

It is an object of the present invention to provide a method of making an integral tire rim of a highly novel construction.

It is another object of the present invention to provide a highly novel method for fabricating tire rims which allows for the manufacture of tire rims at a relatively low cost.

Other and further objects of the present invention will become readily apparent to those skilled in the art from a consideration of the following specification taken in connection with the appended drawings.

In the drawings, which illustrate the best mode presently contemplated for carrying out the invention:

FIG. 1 is a perspective view of a portion of a tire rim, pursuant to the present invention;

FIG. 2 is a cross-sectional view, on an enlarged scale, taken through the tire rim;

Figure 4:
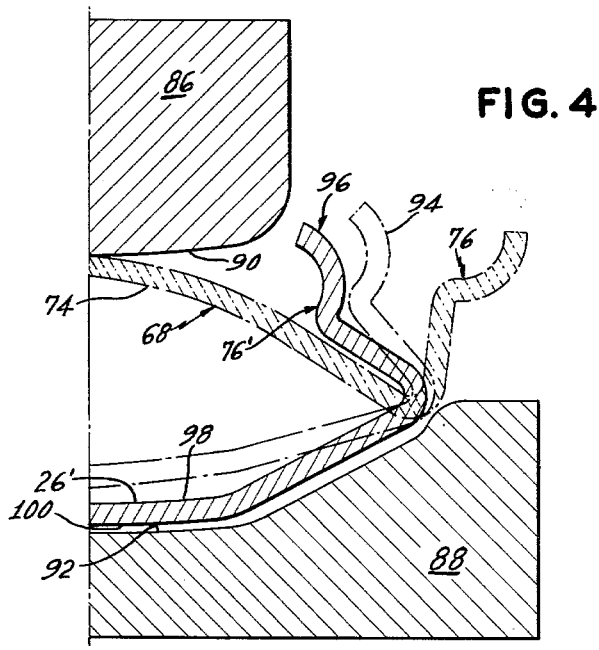

FIGS. 3, 4, 5 and 6 are sectional views taken through rolls which are utilized in accordance with the method of the present invention to fabricate the tire rim illustrated in FIG. 1, each figure illustrating only one-half of symmetrical rolls and one-half of symmetrical blanks positioned between the rolls, the rolls being shown in the relative positions thereof at the inception of the respective operation; and FIGS. 7, 8, 9 and 10 illustrate in full lines the corresponding rolls at the completion of each operation, and in dashed lines the corresponding rolls at the inception of each operation.

Referring now to FIGS. 1 and 2 of the drawings in detail, there is shown a tire rim 20, pursuant to the present invention. As here shown, the rim 20 is of the standard EA3 type intended to fit standard straight side 1⅜″ tires for bicycles. However, it will be understood that the utility of rim 20 is not limited to bicycles and that the rim can be used with other types of vehicles.

Rim 20 is an integral unit formed of a suitable sheet metal, preferably steel or a steel alloy. As here shown, the rim comprises the opposing flanges 22 and 24 which are provided on a dished or arcuate rim base 26. The flanges and base define a radially open tire-receiving channel which extends circumferentially of the outer rim surface. Each flange comprises an outer wall 28, which flares outwardly and upwardly from the rim base 26, and an arced inner wall 30 which is connected to the outer wall by a circumferential bead 32. Each inner wall has a first linear portion 34 which extends inwardly from the adjacent bead 32 and an arcuate portion 36 which terminates adjacent base 26. The linear and arcuate portions of each wall 30 are joined by a nose 38 which is directed toward the associated outer flange wall 28. While the drawings illustrate a small clearance between nose 38 and outer flange wall 28, a larger clearance or none at all would be equally suitable. It will be understood that each nose 38 and its associated wall portions 34 and 36 define a tire seat, generally indicated by reference numeral 40. Each tire seat is rigidified and strengthened by a free-end spur 42 provided on the arcuate wall portion 36.

In order to fabricate tire rim 20, flat metallic stock is first formed into a hoop 43 (FIG. 3), in conventional manner. The hoop 43 defines the starting blank which is first subjected to the action of a pair of rolls 44–46, in a rolling machine. Said rolls are relatively movable to and from the inoperative position thereof shown in FIG. 3 and the operative position thereof shown in full lines in FIG. 7. Male roll 44 is provided with a concave operative surface 48 which has opposing marginal edges, each defined by a nose 50. A convex marginal edge 52 is defined laterally upwardly of each marginal nose 50. The companion female roll 46 is provided with an upper convex surface 54, which is complementary to concave surface 48, a pair of relatively deep concavities 56, which are complementary to the associated noses 50, and a pair of relatively shallow concavities 58 which are complementary to the associated arcuate edges 52. Outwardly of each concavity 58, roll 46 is provided with a seat 60.

In the initial step of performing the rim-fabricating method pursuant to the present invention, the rolls 44 and 46 are separated as shown in FIG. 3 and the blank 43 is positioned in the seats 60–60 of lower roll 46. The rolls are then moved together to the positions thereof shown by the full lines in FIG. 7, so that the blank 43 successively assumes the shapes indicated by the reference numerals 62, 64, 66 and 68. A comparison of starting blank 43 and partially fabricated blank 68 shows that the latter has an upwardly curved base 70 which has an upper or inner convex surface 72 and a lower or outer concave surface 74. In addition, the partially fabricated blank 68 is provided with opposing marginal conformations or flanges 76. Each flange 76 includes a pair of free end hooks 78 formed by inwardly directed mating roll portions 52 and 58, a linear wall portion 80 adjacent each hook, an inwardly directed nose 82 between each hook and its associated wall portion, and an outwardly directed nose 84 between each wall portion and the adjacent end of the base 70.

Figure 8:
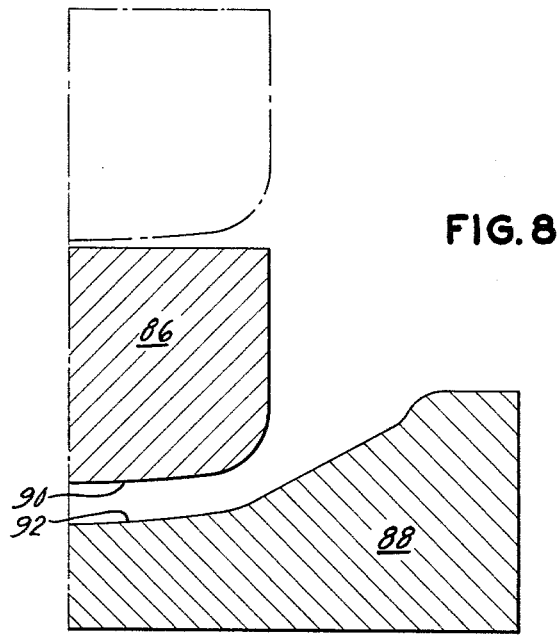

The partially fabricated blank 68 is next subjected to the action of the companion pair of rolls 86 and 88, illustrated in FIGS. 4 and 8. Upper roll 86 has a convex operating surface 90 and lower roll 88 has a concave operating surface 92. With the rolls in the inoperative position thereof, as in FIG. 4, the partially fabricated blank 68 is disposed therebetween and the rolls are moved together from the position shown by the dashed lines in FIG. 8 to the position thereof shown by the full lines in FIG. 8. As the rolls move together, partially fabricated blank 68 successively assumes the shapes indicated by the reference numerals 94 and 96, the latter reference numeral indicating the partially fabricated blank produced by the rolls 86 and 88.

It will be noted that, pursuant to a highly novel aspect of the present invention, the upwardly directed base 74 of blank 68 has been reversed so as to define, in partially fabricated blank 96, a downwardly directed base 26'. As is apparent from a comparison of FIG. 4 with FIG. 2, said downwardly directed base 26' in blank 96 (FIG. 4) corresponds to base 26 in the final rim 20 (FIG. 2). It will be noted that base 26' of blank 96, has an upper or inner concave surface 98 and a lower or outer convex surface 100. It will also be noted that the reversal of the base of the partially fabricated blank 68 has caused the flanges 76 thereof to be deflected inwardly toward the center of the base so as to assume, in partially fabricated blank 96, the position shown by 76'. The formation of the base 26' (corresponding to 26 in FIG. 2) has now been completed and in the succeeding operations the flanges 76' are shaped into their final form.

Figure 5:
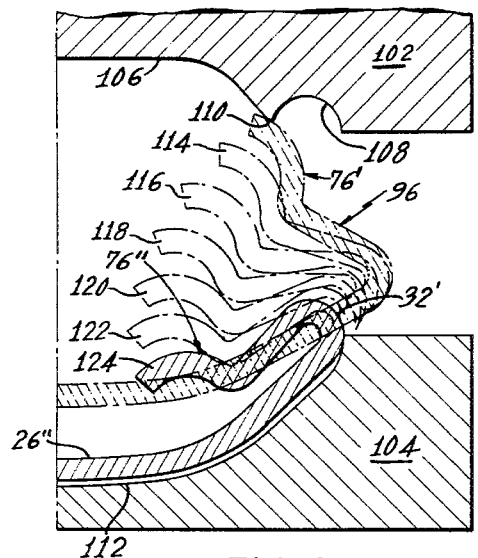
Figure 9:
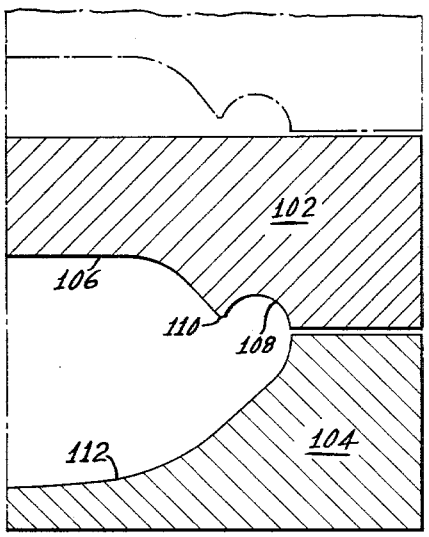

The partially fabricated blank 96 is now subjected to the action of the companion rolls 102 and 104, shown in FIGS. 5 and 9. The upper roll 102 is provided with a major operating surface concavity 106 centered between a pair of outer minor operating surface concavities 108. A finger 110 is defined between concavity 106 and each concavity 108. The lower roll 104 is provided also with a concave operating surface 112. As the rolls are moved together from the position thereof shown in FIG. 5 to the position thereof shown by the full lines in FIG. 9, the partially fabricated blank 96 passes successively through the shapes thereof indicated by the reference numerals 114, 116, 118, 120, 122 and 124. It will be noted that each flange 76', in partially fabricated blank 96, has been urged by finger 110 (as roll 102 has moved toward roll 104) to the position thereof identified by 76" in partially fabricated blank 124 in which it overlies dished base 26" of said blank 124. It will be apparent that the concavities 108 of roll 102 function as fulcrum surfaces for the associated blank noses which have been now formed into the peripheral beads 32' which correspond to beads 32 of the final rim 20.

Figure 6:
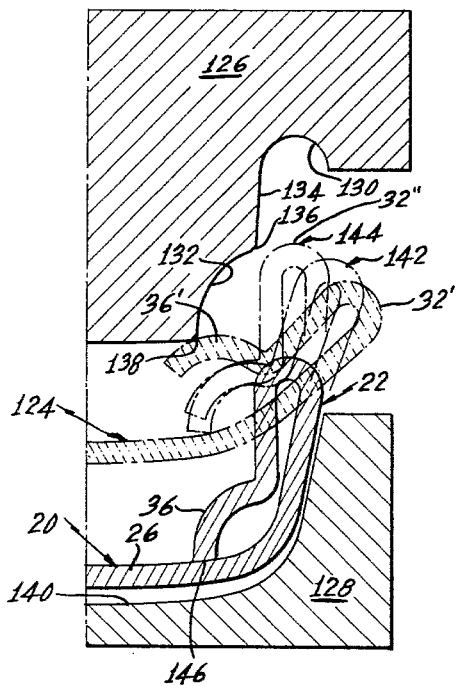
Figure 10:
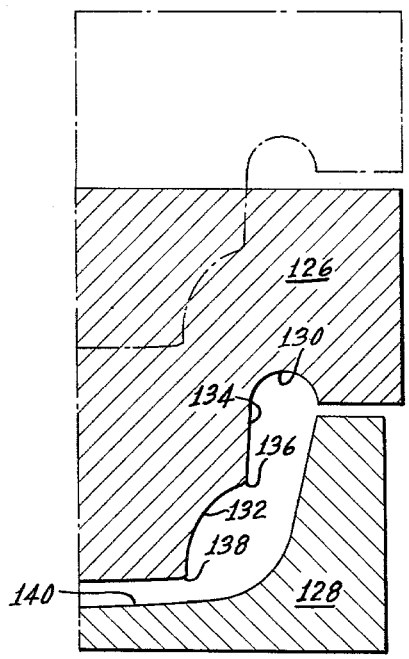

For the final operation pursuant to the method of the present invention, the partially fabricated blank 124 is now subjected to the action of the cooperating rolls 126 and 128 shown in FIGS. 6 and 10. The upper roll 126 is provided with a pair of outer marginal substantially hemispherical operating concavities 130. Laterally below and inwardly of each concavity 130, roll 126 is provided with an arcuate operating concavity 132. A linear vertical operating surface 134 extends between concavity 130 and concavity 132 and the latter is provided with the roll noses 136 and 138 at the ends thereof. The lower roll 128 is provided with a relatively deep concave operating surface 140. With the now almost completed blank 124 placed between rolls 126 and 128, as the rolls move together from the position shown by the dashed lines in FIG. 10 to the position thereof shown by the full lines in FIG. 10, blank 124 passes through the conditions thereof indicated by reference numerals 142 and 144 to form the completed rim 20. It will be noted that during the operation of rolls 126 and 128, the rim flanges 22 and 24 are finally shaped by the described roll portions as the bead 32' of blank 124 is moved inwardly to the position thereof shown at 32" on 144 and then downwardly to its final position shown on the completed rim 20. A similar movement occurs with respect to hook 36' on partially fabricated blank 124 which finally becomes the previously described wall portion 36 in rim 20.

In view of the foregoing, it will be apparent that the flat metal hook blank 43 is first provided with an upwardly directed arcuate base 70 and the diverging marginal flanges 76. Thereafter the upwardly bowed base is reversed to form a downwardly bowed base 26' and the diverging flanges are turned and reversed by substantially 180 degrees so that the free end 146 (FIG. 6) of each arcuate portion 36 finally confronts the upper surface of the completed rim's base 26, as shown in FIG. 6.

While I have illustrated and described the presently preferred method for fabrication of my tire rim, it will be apparent that changes and modifications may be made therein without, however, departing from the basic inventive concept thereof, as set forth in the appended claims.

Having thus described my invention, what I claim and desire to secure by letters patent, is:

1. The method of fabricating a tire rim comprising the steps of providing a hoop formed of flat stock, forming said stock to provide a base portion which is bowed outwardly of said hoop and a pair of peripheral flanges on said base portion which are directed outwardly of said hoop, and reversing both the curvature of said bowed portion and the direction of said flanges.

2. The method of fabricating a tire rim comprising the steps of forming flat stock into a hoop, shaping the stock to form a base portion on said hoop which is bowed outwardly from the center of said hoop and which base portion is provided with peripheral flanges which are directed outwardly from said center, reversing the curvature of said base portion to bow inwardly toward the center of said hoop, and reversing the direction of said flanges so that said flanges are directed inwardly toward said center.

3. The method of fabricating a tire rim comprising the steps of forming flat stock into a hoop, shaping the stock to form a base portion on said hoop which is bowed outwardly from the center of said hoop and which base portion is provided with peripheral flanges which are directed outwardly from said center, reversing the curvature of said base portion to bow inwardly toward the center of said hoop, and curling said flanges inwardly toward said center.

4. The method of fabricating a tire rim comprising the steps of forming flat stock into a hoop, shaping the stock to form a base portion on said hoop which is bowed outwardly from the center of said hoop and which base portion is provided with peripheral flanges which are directed outwardly from said center, reversing the curvature of said base portion to bow inwardly toward the center of said hoop, and curling said flanges inwardly toward said center so as to confront the opposing inner side surfaces of said base portion.

5. The method of fabricating a tire rim comprising the steps of forming flat stock into a hoop, shaping the stock to form a base portion on said hoop which is bowed outwardly from the center of said hoop and which base portion is provided with peripheral flanges which are directed outwardly from said center, reversing the curvature of said base portion to bow inwardly toward the center of said hoop, and curling said flanges inwardly toward said center so as to confront the opposing inner side surfaces of said base portion and forming a peripheral bead along the curl line of each flange.

6. The method of fabricating a tire rim comprising the steps of forming flat stock into a hoop, shaping the stock to form a base portion on said hoop which is bowed outwardly from the center of said hoop and which base portion is provided with peripheral flanges which are directed outwardly from said center, reversing the curvature of said base portion to bow inwardly toward the center of said hoop, and curling said flanges inwardly toward said center so as to confront the opposing inner side surfaces of said base portion, and positioning the free marginal edge of each flange in confronting relation with the inner bottom surface of said base portion.

7. The method of fabricating a tire rim comprising the steps of forming flat stock into a hoop, shaping the stock to form a base portion outwardly bowed from the center of said hoop and to form outwardly directed peripheral flanges having a straight portion and an outer hook portion connected by a nose portion, reversing the curvature of the base portion to bow inwardly toward the center of said hoop, curling said flanges inwardly toward said center so as to confront the opposing inner side surfaces of said base portion with the nose portion contiguous to said inner side surfaces of said base portion, forming a peripheral bead along the curl line of each flange and further forming said opposing inner side surfaces of said base portion to direct said surfaces in a generally radially outward direction to position the free marginal edge of the hook portion in confronting relation with the inner bottom surface of said base portion.

8. The method of fabricating a tire rim comprising the steps of deforming flat stock to form a central base portion which is bowed outwardly of the plane of the flat stock, forming peripheral flanges which are directed outwardly from the plane of the flat stock in the same direction as said base, reversing the curvature of said bowed portion and reversing the direction of said flanges.

References Cited by the Examiner

UNITED STATES PATENTS

| | | | |
|---|---|---|---|
| 1,649,922 | 11/1927 | Paull | 219—83 |
| 1,809,605 | 6/1931 | Sauzedde | 29—159.1 |
| 2,291,393 | 7/1942 | Le Jeune | 29—159.1 |
| 2,345,993 | 4/1944 | Sinclair | 29—159.1 |
| 2,825,961 | 3/1958 | Woodward | 29—159.1 |
| 2,992,045 | 7/1961 | Martenet | 301—97 |
| 3,107,125 | 10/1963 | Yazell | 301—97 |

WHITMORE A. WILTZ, *Primary Examiner.*

ARTHUR L. LAPOINT, *Examiner.*

THOMAS H. EAGER, R. J. JOHNSON,
    *Assistant Examiners.*